US009545092B2

(12) United States Patent
Schumacher et al.

(10) Patent No.: US 9,545,092 B2
(45) Date of Patent: Jan. 17, 2017

(54) MOSQUITO COIL AND HOLDER SYSTEM

(71) Applicant: S.C. Johnson & Son, Inc., Racine, WI (US)

(72) Inventors: Donald J. Schumacher, Racine, WI (US); Mark W. Geis, Oak Creek, WI (US); Ranjit A. De Silva, Racine, WI (US); Neysa Volkert, Racine, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 118 days.

(21) Appl. No.: 13/921,243

(22) Filed: Jun. 19, 2013

(65) Prior Publication Data
US 2014/0373431 A1    Dec. 25, 2014

(51) Int. Cl.
*A01M 1/20*    (2006.01)

(52) U.S. Cl.
CPC ......... *A01M 1/2066* (2013.01); *A01M 1/2055* (2013.01)

(58) Field of Classification Search
CPC .. A01M 13/00; A01M 13/003; A01M 1/2066; A01M 1/2055
USPC ....... 43/124, 125, 129, 132.1; 422/120, 123, 422/125, 126; 220/752, 759–765, 768, 220/776, 735, 736, 574, 574.2, 574.3, 220/575; 206/205, 207, 557, 565, 566; 248/470, 472, 318
See application file for complete search history.

(56) References Cited

U.S. PATENT DOCUMENTS

| | | | | |
|---|---|---|---|---|
| 123,648 A | * | 2/1872 | Stratton | 220/762 |
| 136,576 A | * | 3/1873 | Woodruff | 220/642 |
| 181,516 A | * | 8/1876 | Fitzhugh | 294/68.26 |
| 487,688 A | * | 12/1892 | Wood | 220/764 |
| 883,839 A | * | 4/1908 | Swaysey | 220/751 |
| 928,101 A | * | 7/1909 | Brakeman | 220/765 |
| 944,777 A | * | 12/1909 | Feldman | 220/762 |
| 999,315 A | * | 8/1911 | Kimberly | 16/445 |
| 1,412,516 A | * | 4/1922 | Ghosh | A61L 9/03 422/126 |
| 1,474,910 A | * | 11/1923 | Petersen | F21V 35/00 431/297 |
| 1,488,397 A | * | 3/1924 | Judge | 220/23.4 |
| 1,609,814 A | * | 12/1926 | Gray | F21V 21/02 422/126 |

(Continued)

FOREIGN PATENT DOCUMENTS

| | | |
|---|---|---|
| CN | 102860298 A | 1/2013 |
| GB | 2276547 A | 10/1994 |

(Continued)

OTHER PUBLICATIONS

A one page Nov. 11, 2011 news report entitled "Mosquito Coil Good Design Award 2011" by unknown author, admitted prior art.

(Continued)

*Primary Examiner* — Darren W Ark
*Assistant Examiner* — Magdalena Topolski

(57) ABSTRACT

Disclosed are holders for supporting a burnable substrate such as a mosquito coil. They have an ash tray, a mounting post coupled to the ash tray and moveable between a storage position wherein both an outward part and an inward part of the mounting post are adjacent the ash tray and an erected position where the mounting post is suitable to support the burnable substrate, and a locking bracket linked to the ash tray which is suitable to retain the mounting post in the erected position when that is desired. In some forms multiple such coils and holders are housed in a compact kit.

14 Claims, 10 Drawing Sheets

(56) References Cited

U.S. PATENT DOCUMENTS

| | | | |
|---|---|---|---|
| 2,286,175 A * | 6/1942 | Wackman | 220/375 |
| 2,294,197 A * | 8/1942 | Moore | A47J 45/075 16/411 |
| 3,207,298 A * | 9/1965 | Wilson | 206/364 |
| 3,731,840 A * | 5/1973 | Beutler et al. | 220/570 |
| 3,796,002 A | 3/1974 | Katsuda | |
| 4,099,916 A * | 7/1978 | Gardner et al. | 422/126 |
| 4,347,217 A * | 8/1982 | Radkins et al. | 422/126 |
| 4,691,473 A * | 9/1987 | Ragen | 47/67 |
| 4,823,433 A * | 4/1989 | Curtis | B44D 3/14 16/411 |
| 5,836,043 A * | 11/1998 | Rovas | E06C 7/14 15/257.06 |
| 6,061,950 A * | 5/2000 | Carey | A01M 1/2066 422/126 |
| 6,389,739 B1 | 5/2002 | Borut et al. | |
| 6,406,673 B1 * | 6/2002 | Soller et al. | 422/126 |
| 7,582,245 B2 * | 9/2009 | Welch | 264/319 |
| 8,146,875 B2 | 4/2012 | Pryor | |
| D715,507 S * | 10/2014 | van Pruyssen | D32/53 |
| 2002/0124459 A1 | 9/2002 | Davis | |
| 2002/0192122 A1 * | 12/2002 | Tak | 422/120 |
| 2005/0011903 A1 * | 1/2005 | Su et al. | 220/762 |
| 2013/0001232 A1 * | 1/2013 | Hansen | 220/573.1 |

FOREIGN PATENT DOCUMENTS

| | | |
|---|---|---|
| OA | 7350 A | 8/1984 |
| WO | WO00/01230 A1 | 1/2000 |
| WO | WO 2012/094953 | 7/2012 |

OTHER PUBLICATIONS

International Search Report and Written Opinion for PCT/US2014/041691 dated Oct. 22, 2014.

A one page May 7, 2013 web excerpt of a Coghian's ad entitled "#8688—Mosquito Coil Holder", admitted prior art.

A one page Dec. 18, 2012 web excerpt entitled "Coil Stand", by coilstand.com, admitted prior art.

A one page Dec. 26, 2012 web excerpt entitled "Lady Bird Mosquito Coil Holder" by geckodecko.com, admitted prior art.

A one page Dec. 19, 2012 web excerpt entitled "Royalty Free Stock Images: Stack of Green Mosquito Coils". by dreamstime, admitted prior art.

A one page Dec. 27, 2012 web excerpt, untitled, showing a mouse trap, by gstatic.com, admitted prior art.

\* cited by examiner

MOSQUITO COIL AND HOLDER SYSTEM

CROSS-REFERENCE TO RELATED APPLICATIONS

Not applicable

STATEMENT REGARDING FEDERALLY SPONSORED RESEARCH/DEVELOPMENT

Not applicable

BACKGROUND OF THE INVENTION

The present invention relates to burnable insect control substrates (e.g. mosquito coils), holders for supporting them when they are burning (and thereby dispensing an air treatment chemical such as a repellent), and kits that include multiple such substrates, multiple such holders, and a compact container therefor.

Burnable substrates such as mosquito coils and incense coils are designed to provide sustained air treatment chemical release when burnt. They burn very slowly (because they are often designed to last overnight, or a significant portion thereof). As a result, they are susceptible to being inadvertently extinguished if they are positioned directly on a supporting surface such as a table. Thus, mosquito coils are often supported mostly or only at their center, such as by being impaled on a centrally positioned holder post. See e.g. U.S. patent application publication 2002/0124459 and U.S. Pat. No. 8,146,875.

While such holder posts reduce the incidence of premature extinguishing, ashes from such coils/substrates may drop down onto the supporting surface underneath such holders. This presents a somewhat messy appearance, and may limit where the holder stand is placed (e.g. if a support table is made of a particularly delicate material). As such burnable coil holders have been developed in which the stand is used with some form of ash tray. See U.S. Pat. Nos. 3,796,002 and 6,389,739. However, typical such ash tray included assemblies are not particularly compact, and as a result have an increased shipping cost, an increased material cost, and/or take up more retail shelf space than is optimal.

There have therefore been attempts to create slab-like holders where a tang of the slab can pivot up from a compact shipping position to a use/support position (so that the slab is very compact until use, and part of the holder acts like an ash tray even after the tang is pivoted up). However, the tang relies on material characteristics to keep it vertical. As a result, when the mosquito coil or similar substrate is being mounted on the tang the tang can tend to bend back down out of the desired supporting position.

Yet another problem is that when such coils are used outdoors (e.g. in a typical patio area) the repellent coverage of a single coil may not be sufficient to achieve adequate protection for somewhat larger size areas such as patio areas. It may therefore be desired to sometimes use multiple such coil/stand devices simultaneously, positioned in an array. Transporting multiple such devices to such an area, in one trip, can be somewhat awkward.

Accordingly, a need still exists for an improved mosquito coil/burnable substrate and holder, and improved kits containing such devices.

BRIEF SUMMARY OF THE INVENTION

In one aspect the invention provides a holder for supporting a burnable substrate (e.g. a mosquito coil). There is an ash tray, a mounting post coupled to the ash tray and moveable between a storage position wherein both an outward part and an inward part of the mounting post are adjacent the ash tray and an erected position where the mounting post is suitable to support the burnable substrate, and a locking bracket linked to the ash tray which is suitable to retain the mourning post in the erected position when that is desired.

In preferred forms the ash tray is in the form of a dish, and the mounting post has a foot engagable within a slot of the locking bracket when the mounting post is moved to the erected position. Also, the ash tray can include a hole through its base such that the bracket is mounted in the hole by a press fit. In a particularly preferred form the bracket is configured to permit the foot to move into the slot by a radial movement of the foot (as the mounting post can be elastically deformed by squeezing opposed sides during the movement between the storage position and the erected position). There can be two of said brackets coupled between the ash tray and mounting post, where feet of the mounting post can interfit with slots of both brackets.

In another aspect the invention provides a combined mosquito coil and holder assembly. In addition to a holder of the above type there is also a mosquito coil that dispenses (when burnt) an insect control ingredient such as a repellent or insecticide.

In preferred forms, the mounting post, when in the erected position, is suitable to mount the mosquito coil, and the mounting post is in an off center position relative to the ash tray, whereby the mosquito coil can be mounted completely over the ash tray when placed on the mounting post. Also, when the mounting post is made from a bent wire the mounting post may have a leg portion for supporting the outward part of the mounting post, wherein the outward part is thinned relative to a part of the leg portion adjacent the outward part. This allows the legs to provide significant strength yet optimizes the shape of the mounting spike.

In a further aspect of the invention, there is provided a kit for controlling mosquitoes in a defined area (e.g. at or near a patio). The kit has a container with an internal cavity and an upper opening. A lid can removably close the upper opening of the container to create a compact package suitable for long-term storage or shipment.

At least three mosquito coils and at least three mosquito coil holders are preferably positioned in the internal cavity of the container. The three mosquito coil holders can be as described above. In especially preferred forms of the kit the mosquito coils and mosquito coil holders are arranged in a stack in the internal cavity, the ash trays are in the form of dishes that are nested together, and the mosquito coils are positioned in the internal cavity below the ash trays. There may also be foam packing (e.g. a packing ring) positioned within the container to minimize the risk of coil breakage during shipment.

The present invention thereby provides an extremely compact, lightweight, kit that can be used to establish a three or more station protective array of burnable substrates for use at a patio or the like. Each burning station can have its own ash tray and erectable supporting post mountable thereon.

Such holders are very inexpensive to produce, and are suitable for use with a wide variety of known mosquito coils and other burnable substrates. Further, these holders are sufficiently resilient that they can be re-used with replacement coils multiple times. This lowers the overall cost of using these devices as compared with single use stands.

The foregoing and other advantages of the invention will be apparent from the following description. In that description reference is made to the accompanying drawings which form a part hereof and in which there is shown by way of illustration preferred embodiments of the invention. These embodiments do not represent the full scope of the invention. Thus, the claims should be looked to in order to judge the full scope of the invention.

DETAILED DESCRIPTION OF THE PREFERRED EMBODIMENTS

Figure 1:
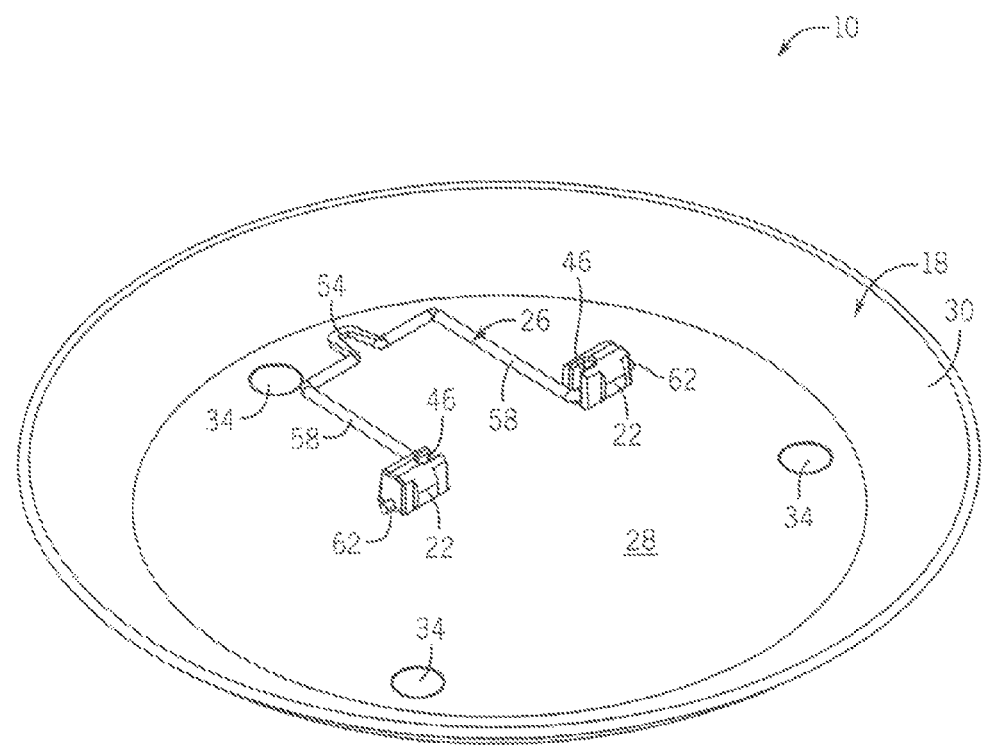
FIG. 1 is a perspective view of a preferred mosquito coil holder of the present invention (with its mounting post shown in a storage position)

FIG. 1 shows a first preferred holder 10 of the present invention. It is suitable for supporting a mosquito coil 14 during use (see FIG. 11). The holder 10 includes an ash tray 18 in the form of a dish, two mounting brackets 22, and a wire mounting past 26.

The ash tray 18 has a floor 28 and upstanding curved side-walls 30 extending front the floor 28. The ash tray is arranged to catch and retain ash that may fall during the burning process shown in FIG. 11. Of course, it need not necessarily be circular or dish-like. For example it can be (in top view) square or rectangular, and/or have other types of outer walls.

To provide heat insulation to supporting surfaces the ash tray 18 may further have three feet 34 that are in the form of bumps created by embossing or stamping. More feet or other heat insulation structures may be used instead.

Figure 3:
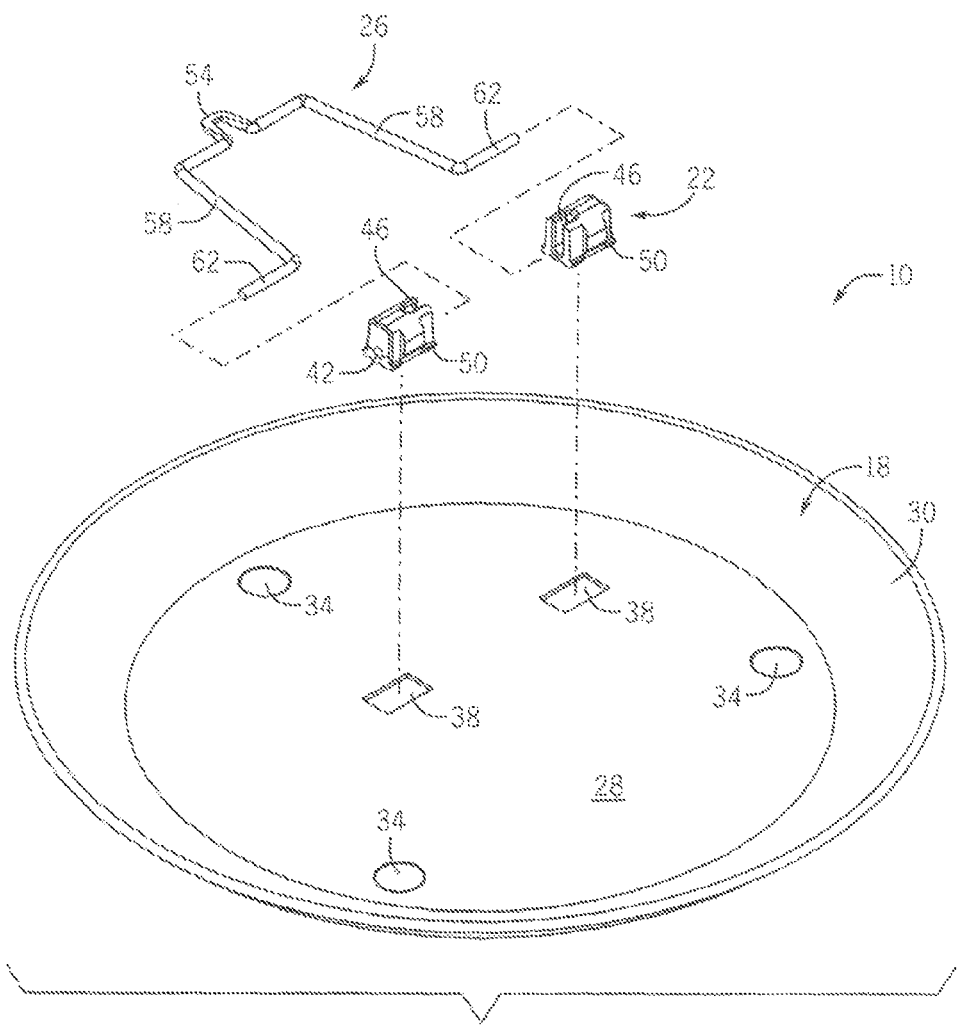
FIG. 3 is an exploded perspective view of the holder of FIG. 1.

As best shown in FIG. 3, ash tray 18 also has two apertures 38 arranged to receive and mount the brackets 22. In the illustrated embodiment, the apertures are generally rectangular and slightly offset if our the precise center of the floor 28.

Figure 5:
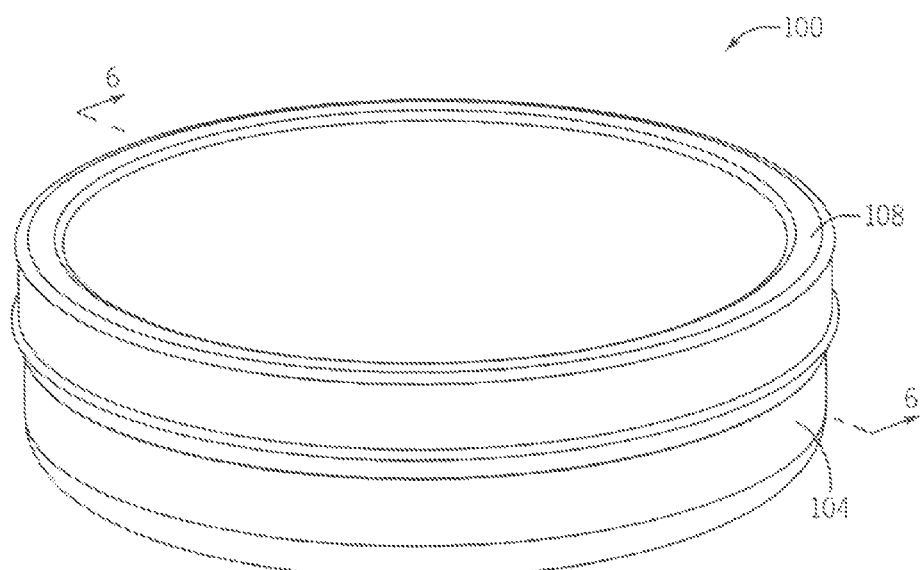
FIG. 5 is a perspective view of a preferred kit according to one aspect of the invention.
Figure 6:
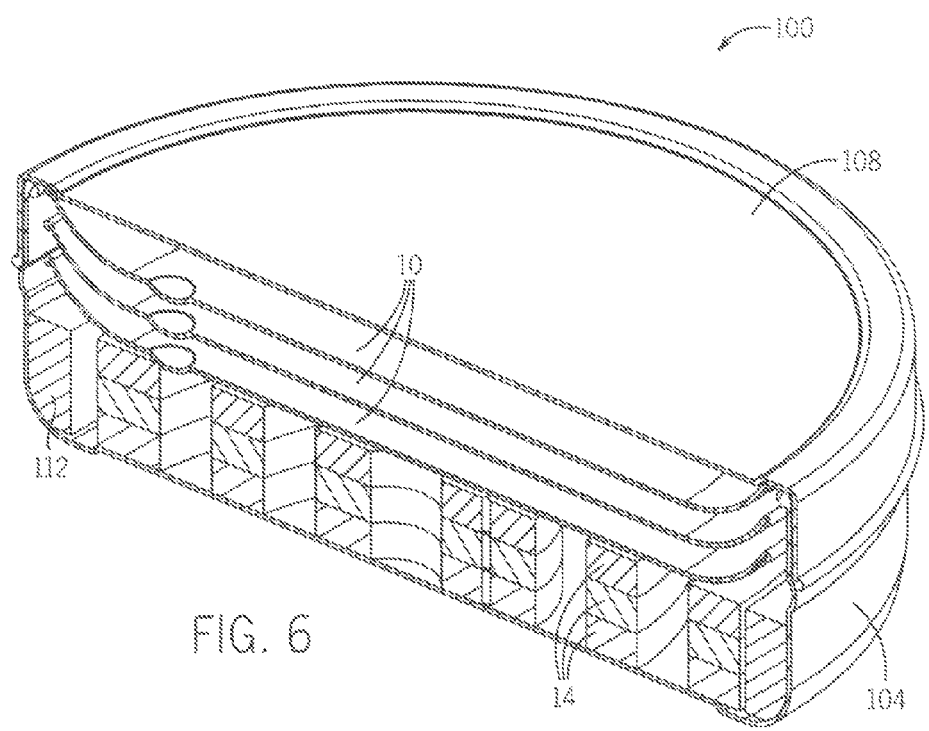
FIG. 6 is a sectional view of the kit of FIG. 5 taken along the line 6-6 of FIG. 5.

Turning back to FIG. 1, each bracket 22 may be formed by an injection molding process and defines a post receiving aperture 42 (see FIG. 5), a slot 46, and a tab 50 (see FIG. 3). The post receiving aperture 42 extends through each bracket 22. Locking slot 46 extends from the post receiving aperture 42 to a top surface of the bracket 22. The tab 50 is arranged to engage the aperture 38 of the ash tray 18 via press fit and maintain the bracket 22 therein.

Mounting post 26 includes a spike 54 at an outward end and two legs 58 at an inward end. Each leg 58 includes a foot 62 sized to be received in the post receiving aperture 42 of the bracket 22. Additionally, each leg 58 is sized such that the diameter of the leg 58 can be received in and engaged with the slot 46 of the bracket 22.

The illustrated mounting post 26 is a bent wire. However, as will be appreciated from FIGS. 3 and 4, the spike 54 may be flattened/thinned. This permits most of the supporting structure to maintain the full strength of the wire, while causing the spike to optimally conform to a slot 120 of a preferred mosquito coil. Its legs 58 are arranged to be flexible such that they may be flexed toward one another under pressing force to permit alignment with the slots 46, and subsequent insertion of the posts as shown in FIG. 3.

Figure 2:
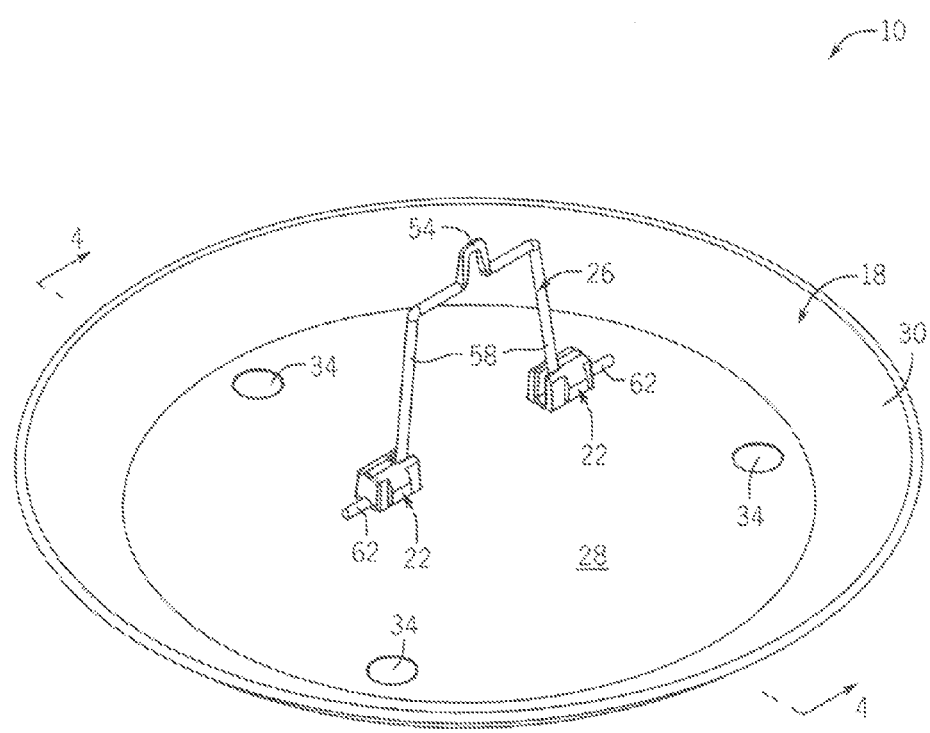
FIG. 2 is a view similar to FIG. 1, but with the mounting post shown in an erected position.

In this regard, as shown in FIG. 2, the mounting post 26 may be rotated upward about the feet 62 until the legs 58 are substantially aligned with the locking slots 46. After both of the legs 58 are pressed towards each other, and aligned with the slots 46, the legs 58 can then flex away from one another to the erected/locked position. The mounting post 26 is arranged such that the legs 58 are biased toward the erected position. Once the legs 58 are aligned with the slots 46 and moved to the extended position, the slots 46 engage the legs 58 and inhibit there removal therefrom via press-fit.

One advantage of the holder 10 is that it may be reconfigured between an extremely compact shipping position and the erected position, preferably a number of times without permanently deforming the mounting post 26 or any other component of the holder 10. The mounting post 26 is elastically deformed as it moves between the flexed position and the erected position, albeit in a way that substantially no permanent deformation occurs. Additionally, when the holder is in the erected position, the mounting post 26 is substantially rigid and can withstand a significant downward pressure or force (such as might occur it a consumer tries to use too much pressure to mount a coil).

Figure 4:
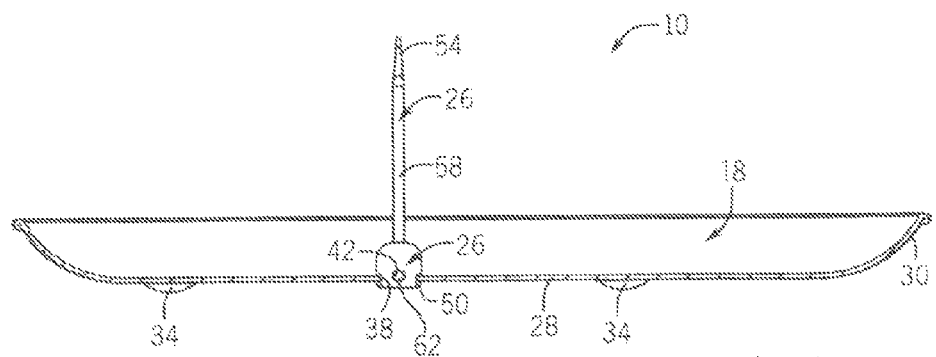
FIG. 4 is a side section view of the holder taken along line 4-4 of FIG. 2.

From FIGS. 2 and 4 it will be appreciated that the spike 54, when in the erected position, may be in a somewhat off center position relative to the ash tray such that when a preferred mosquito coil 14 is mounted thereon the coil can be positioned entirely over the ash tray 10.

Turning next to FIGS. 5-9, a kit 100 is shown which includes a container 104 and a lid 108. The lid 108 is attached to the container 104 via press-fit. However, in other possible embodiments the lid 108 may be threadingly engaged with the container 104 or attached thereto in another way. The illustrated container 104 and lid 108 may be formed from stamped metal such as aluminum.

Figure 7:
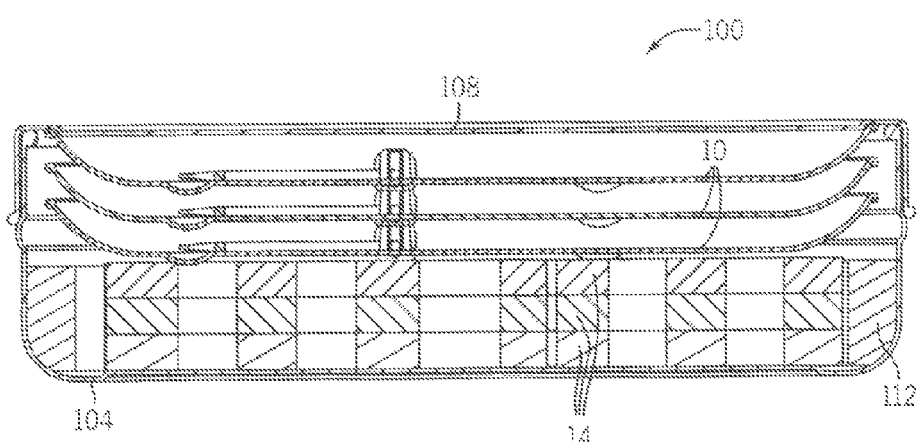
FIG. 7 is a view similar to FIG. 6, but taken from an elevational view point rather than a perspective view point.
Figure 8:
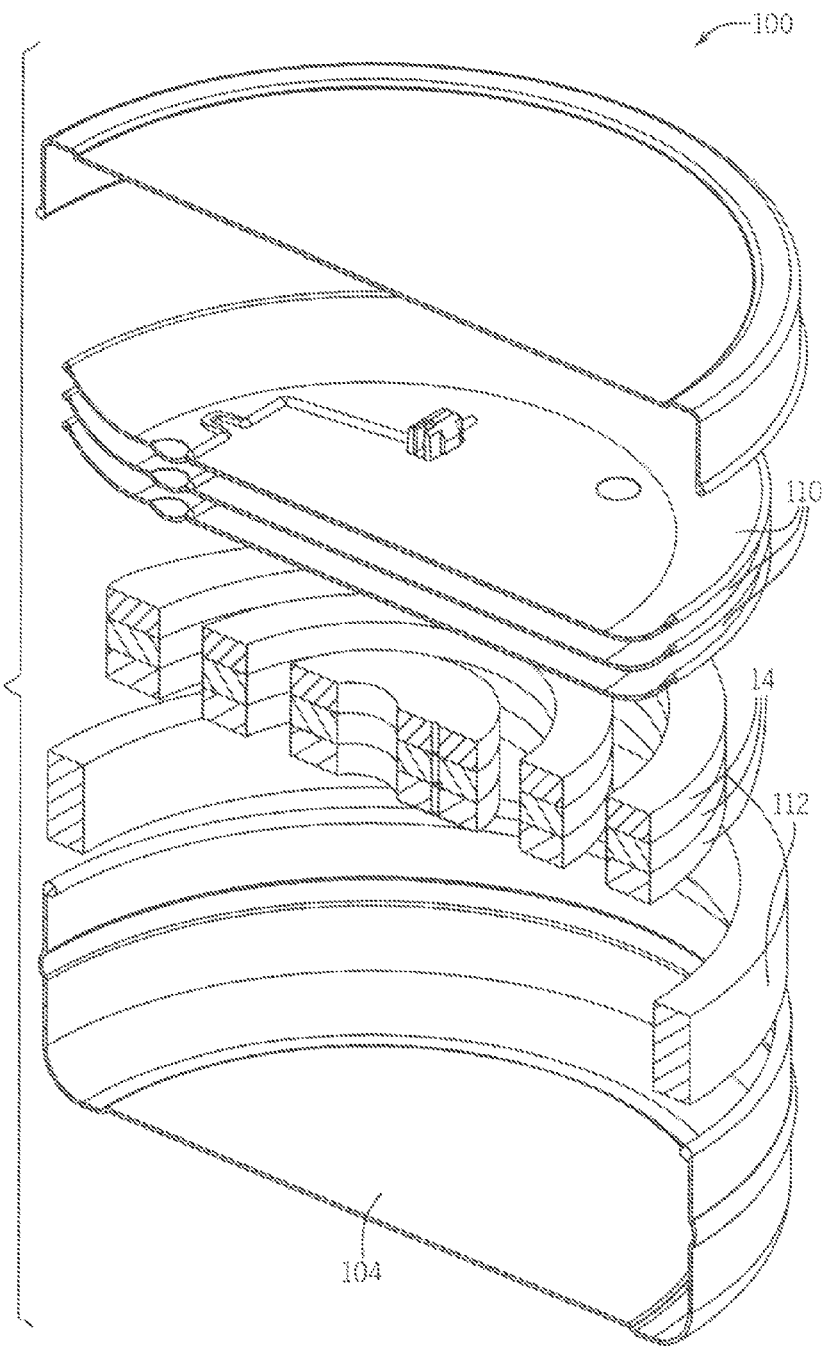
FIG. 8 is an exploded perspective view of the FIG. 6 drawing.

FIG. 7 shows three mosquito coils 14 and three holders 10 arranged in stacked (and in the case of the holders, also nested) fashion inside the container 104. A foam packing ring 112 inhibits breakage of the coils during shipment (as the coils 14 will preferably have a smaller diameter than the holders 10 to insure that ashes fall on the holder).

Figure 9:
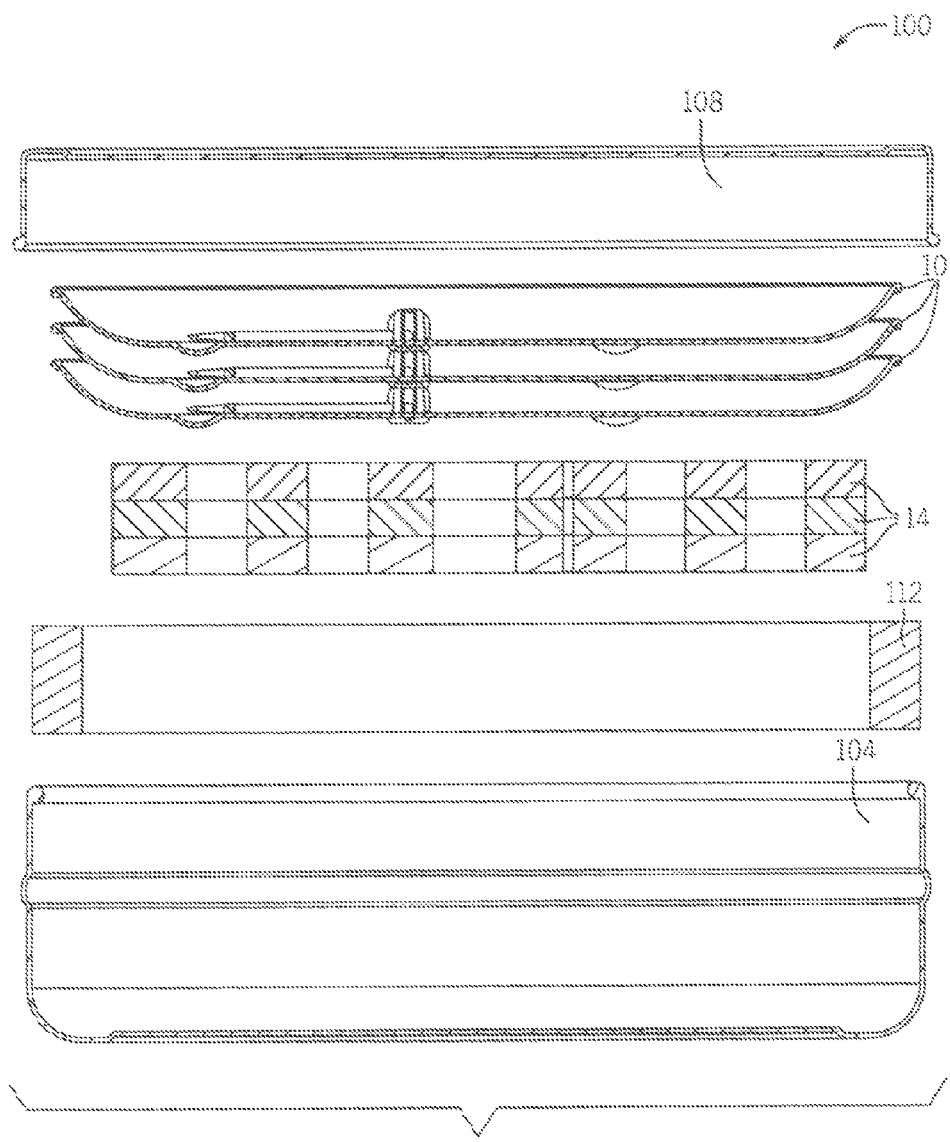
FIG. 9 is an elevational view of the FIG. 8 parts.
Figure 12:
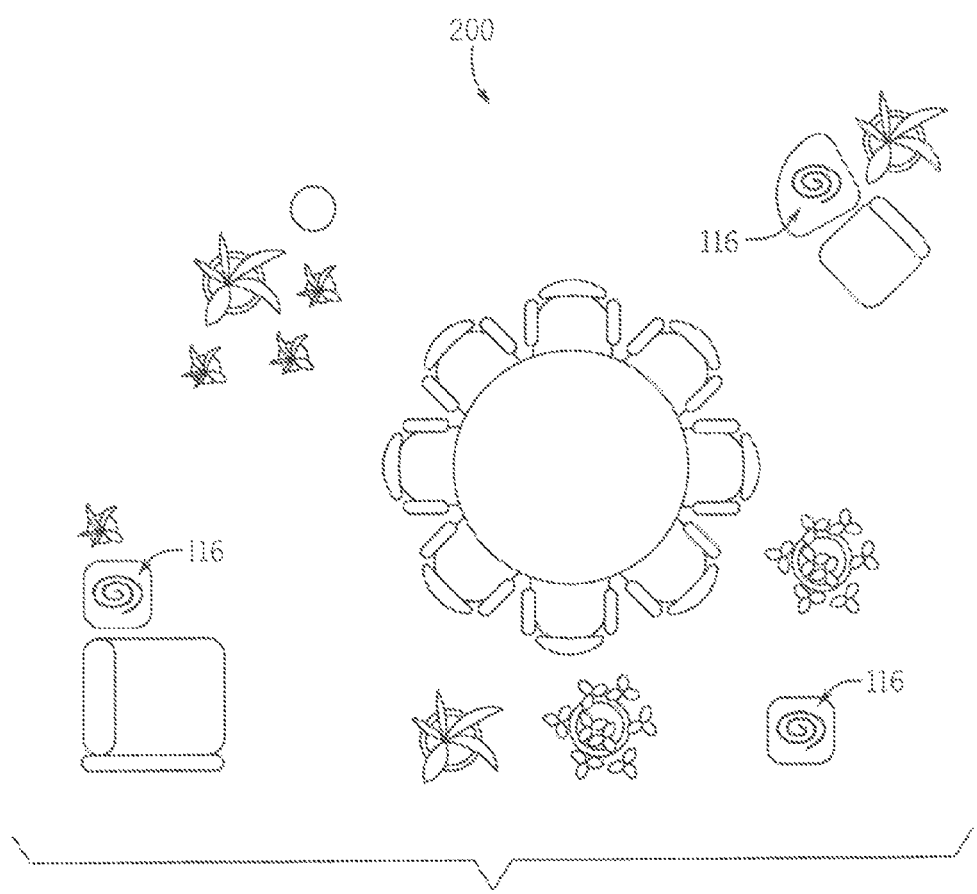
FIG. 12 is a top view of an example patio area where a triangular array of three of the coil stations have been positioned (using the components of a kit of the present invention).

FIG. 9 illustrates how the kit 100 may be unpacked after the kit is carried to a FIG. 12 type usage area. The lid 108 is first separated from the container 104, and then the holders 10 are removed. One mosquito coil 14 is then removed and directly installed on each spike 54 to thereby form a mosquito coil station 116. Removing the holders 10 first, setting them up, and only then installing the mosquito coils 14 provides the user with a kit wherein each somewhat fragile mosquito coil 14 is handled only one time to complete assembly of a mosquito coil station 116.

Figure 10:
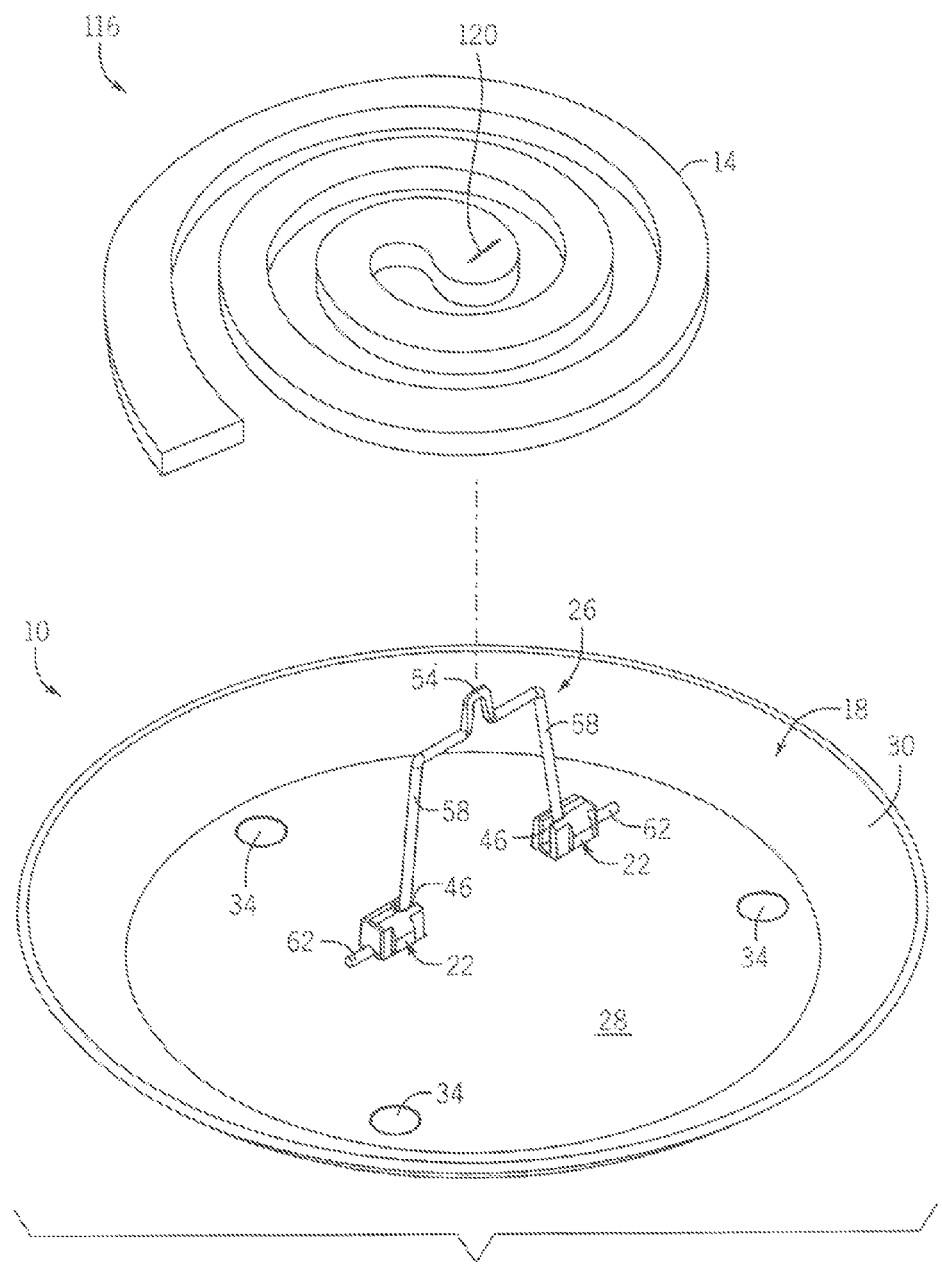
FIG. 10 is a perspective view of a preferred combined coil and holder, with the coil shown in the process of being mounted on a mounting post.
Figure 11:
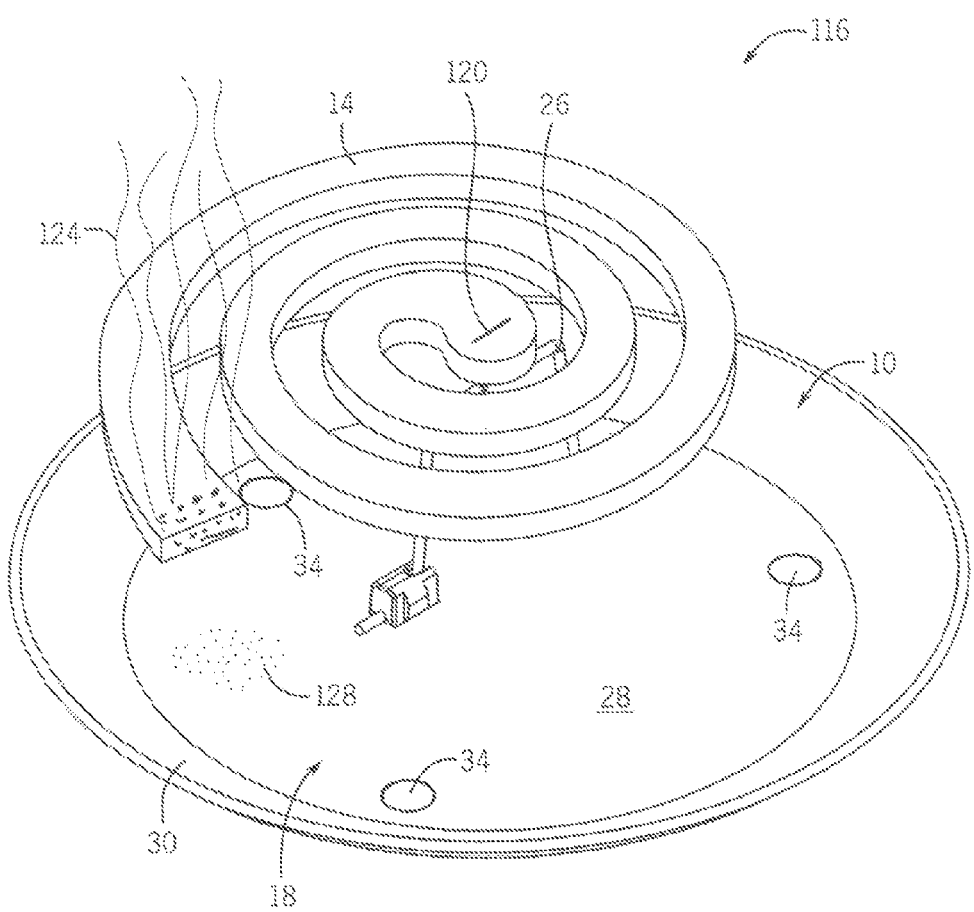
FIG. 11 is a view similar to FIG. 10, but with the coil shown fully mounted on the mounting post.

FIGS. 10 and 11 depict how the mosquito coil station 116 is preferably assembled. First, the holder 10 is moved to the erected position as discussed above. With the legs 58 locked within the slots 46, the holder 10 is placed at a desired location. The mosquito coil 14 is then positioned with its slot 120 above the spike 54 and pushed down onto the spike 54 such that the mosquito coil 14 is held in place suspended above the ash tray 18.

FIG. 11 shows an assembled mosquito coil station 116 with the mosquito coil 14 lit, and active containing smoke 124 being produced. Any resulting ash 128 will be caught in the ash tray 18 as it falls from the mosquito coil 14.

FIG. 12 shows one exemplary use of the kit 100. This kit 100 includes three mosquito coil stations 116 and thereby provides the user with the means to control a large patio area. The entire patio area 200 may be protected for a typical period of time where a barbecue or the like is held (for example up to four hours).

A variety of positional arrays of multiple stations 116 can be used. For example, the holders may be positioned about six to ten feet away from each other (e.g. about two to three meters away from each other) surrounding an area to be protected. For example, when three coils are used, the coils may be positioned in a triangular configuration surrounding the area to be protected.

The kit 100 makes transport and storage of a plurality of mosquito coil stations 116 easy and compact. More than three holders 10 may be included in the kit 100. Additionally, more than three mosquito coils 14 may be included in the kit 100.

Each mosquito coil 14 may be of a conventional type (e.g. made of a mostly dry cellulosic dough dosed with an air treatment chemical). As is well known, such coils can be lit at their outer end (e.g. with a match) and then burned (e.g. over about a four hour period) to the center of the spiral. This dispenses the active ingredient into the air and in some cases leaves a smell amount of ash residue behind.

While the air treatment chemical may be chosen from a wide variety of possible actives (e.g. repellents, insecticides, fragrances, deodorizers, etc.), for patio area insect repellent use it is preferred to use metofluthrin or transfluthrin in a conventional solvent (such as acetone). The active ingredient can be deposited on or immediately near the surface of the coil.

The present invention thus provides a cost effective and space economical solution for providing a plurality of mosquito coil stations in a convenient package. While specific embodiments have been shown, various modifications falling within the breadth and scope of the invention will be apparent to one skilled in the art. For example, the mounting post 26 may be replaced with another post that is movable between a storage position and an erected position without being permanently deformed. For example, a plastic post may be employed or the design of the post may be different. Thus, the following claims should be looked to in order to understand the full scope of the invention.

All documents cited in this patent are, in relevant part, incorporated herein by reference as if fully set forth herein. The citation of any document is not to be construed as an admission that it is prior art with respect to the present invention.

INDUSTRIAL APPLICABILITY

The present invention provides compact stands for supporting burnable substrates such as mosquito coils, and kits containing such coils, such stands and a container, where the combination provides the needed materials to erect a multiple position array of mosquito coils or the like.

What is claimed is:

1. A holder and burnable substrate system, comprising:
an ash tray;
a mounting post comprising two legs, the mounting post coupled to the ash tray and moveable between a storage position wherein both an outward part and an inward part of the mounting post are adjacent the ash tray and an erected position where the mounting post is suitable to support the burnable substrate, and wherein the outward part includes a spike positioned to support the burnable substrate;
two locking brackets configured to engage the two legs and linked to the ash tray, each locking bracket having a locking slot, wherein each leg is retained within the locking slot when the mounting post is in the erected position, and wherein the legs of the mounting post must be flexed toward each other to disengage the slots of the locking brackets when the mounting post is rotated from the erected position to the storage position; and
a burnable substrate mountable on the spike, wherein the burnable substrate includes an air treatment chemical that is released by burning, and the air treatment chemical comprises at least one of an insect repellent, an insecticide, a fragrance, wherein the ash tray has a hole through its base and the bracket is mounted in a hole.

2. The system of claim 1, wherein the burnable substrate is a mosquito coil and the ash tray is in a form of a dish.

3. The system of claim 1, wherein the bracket is configured to permit the leg to move into the slot by a radial movement of the leg.

4. The system of claim 1, wherein the mounting post can be elastically deformed during movement between the storage position and the erected position.

5. The system of claim 1, where there are two of said brackets coupled between the ash tray and mounting post, and legs of the mounting post can interfit with slots of the brackets.

6. The system of claim 5, wherein each mounting post leg includes a foot positioned at a distal end opposite the outward part, the locking brackets include an aperture sized to receive the feet of the mounting post legs, and the feet are retained within the apertures when the mounting post is in the storage position and the erected position.

7. A combined mosquito coil and holder assembly, comprising:
an ash tray;
a mounting post comprising more than one leg and each leg includes a foot, the more than one leg coupled to the ash tray and moveable between a storage position where both an outward part and an inward part of the mounting post are adjacent the ash tray and an erected position where the mounting post is suitable to support the mosquito coil;
more than one locking bracket configured to engage the more than one leg and linked to the ash tray, each locking bracket includes a locking slot and an aperture, wherein each leg is retained within the respective locking slot when the mounting post is in the erected position and each foot is retained within the aperture when the mounting post is in both the erected position and the storage position; and a mosquito coil mountable on an outward part of the mounting post, wherein the mosquito coil includes an insect repellent or an insecticide.

8. The combined mosquito coil and holder assembly of claim 7, wherein the mounting post, when in the erected position, is in an off center position relative to the ash tray.

9. The combined mosquito coil and holder assembly of claim 7, wherein a portion of the mounting post leg supports the outward part of the mounting post, wherein the outward part is thinned relative to the leg portion adjacent the outward part.

10. A kit for controlling mosquitoes in a defined area, the kit comprising:

a container having an internal cavity and an upper opening;

a lid removably closing the upper opening of the container;

at least three mosquito coils positioned in the internal cavity of the container, wherein at least one of the mosquito coils includes an insect repellent or an insecticide;

at least three mosquito coil holders also positioned in the internal cavity of the container;

wherein each of said three mosquito coil holders comprises:

an ash tray;

a mounting post comprising a first leg having a first foot and a second leg having a second foot, the mounting post coupled to the ash tray and moveable between a storage position where both an outward part and an inward part of the mounting post are adjacent the ash tray and an erected position where the mounting post is suitable to support the mosquito coil, wherein the mounting post is in the storage position when positioned in the container;

a first locking bracket including an aperture sized to receive the first foot and a slot configured to engage the first leg of the mounting post, the first locking bracket linked to the ash tray, wherein the first leg is retained within the slot of the first locking bracket when the mounting post is in the erected position and the first foot is retained within the aperture when the mounting post is in both the erected position and the storage position; and a second locking bracket having an aperture and a slot, the second locking bracket also linked to the ash tray, wherein the second leg is retained within the slot of the second locking bracket when the mounting post is in the erected position and the second foot is retained within the aperture of the second locking bracket when the mounting post is in both the erected position and the storage position, and wherein the first and second legs of the mounting post must be flexed toward each other to disengage the slots of the first and second locking brackets when the mounting post is rotated from the erected position to the storage position.

11. The kit of claim 10, wherein said mosquito coils and mosquito coil holders are arrayed in a stack in the internal cavity and the mosquito coils are positioned in the internal cavity below the ash trays.

12. The kit of claim 10, wherein the ash trays are in a form of dishes that are nestable together.

13. The kit of claim 10, further comprising a packing ring positioned within the container.

14. The kit of claim 10, wherein the foot of the mounting post rotates within the aperture of the locking bracket when the mounting post is rotated between the erected position and the storage position.

* * * * *